United States Patent
Bollig et al.

(10) Patent No.: US 8,348,808 B2
(45) Date of Patent: Jan. 8, 2013

(54) METHOD FOR AUTOMATICALLY TURNING OFF AN INTERNAL-COMBUSTION ENGINE

(75) Inventors: Marcus Bollig, Munich (DE); Juergen Poggel, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/074,418

(22) Filed: Mar. 29, 2011

(65) Prior Publication Data

US 2011/0190095 A1    Aug. 4, 2011

Related U.S. Application Data

(63) Continuation of application No. PCT/EP2009/006408, filed on Sep. 4, 2009.

(30) Foreign Application Priority Data

Sep. 30, 2008  (DE) .................. 10 2008 049 801
Dec. 11, 2008  (DE) .................. 10 2008 061 791

(51) Int. Cl.
    *B60W 10/04*    (2006.01)
(52) U.S. Cl. ..................................... 477/183
(58) Field of Classification Search .......... None
    See application file for complete search history.

(56) References Cited

U.S. PATENT DOCUMENTS

| 7,299,904 | B2 * | 11/2007 | Wagu et al. | ................ 303/113.2 |
| 2003/0087724 | A1 | 5/2003 | Seibertz et al. | |

FOREIGN PATENT DOCUMENTS

| DE | 100 23 331 A1 | 6/2001 |
| DE | 102 11 461 C1 | 7/2003 |
| DE | 102 11 463 B3 | 1/2004 |
| DE | 10 2006 028 338 A1 | 12/2006 |
| EP | 0 158 605 B1 | 7/1988 |
| EP | 1 052 399 A2 | 11/2000 |
| EP | 1 302 359 A1 | 4/2003 |
| EP | 1 469 195 A1 | 10/2004 |
| EP | 1 553 289 A1 | 7/2005 |
| EP | 1 469 195 B1 | 9/2006 |
| GB | 2 427 438 A | 12/2006 |

OTHER PUBLICATIONS

German Search Report dated Sep. 14, 2009 with partial English translation (nine (9) pages).
International Search Report dated Jan. 21, 2010 with English translation (six (6) pages).

* cited by examiner

*Primary Examiner* — Roger Pang
*Assistant Examiner* — Erin D Bishop
(74) *Attorney, Agent, or Firm* — Crowell & Moring LLP

(57) ABSTRACT

A method and a corresponding system are provided for automatically turning off an internal-combustion engine in a motor vehicle having an automatic transmission, by use of a start-stop device which automatically turns off the internal-combustion engine when the vehicle is braked to a stopped position and was held in the stopped position for a predefined time interval by operating the brake pedal. Within the predefined time interval after the stopped position was reached, the motor vehicle driver is able to prevent the automatic turning-off of the internal-combustion engine. The turning-off of the internal-combustion engine is prevented when the brake pedal is released by the driver within the predefined time interval.

16 Claims, 1 Drawing Sheet

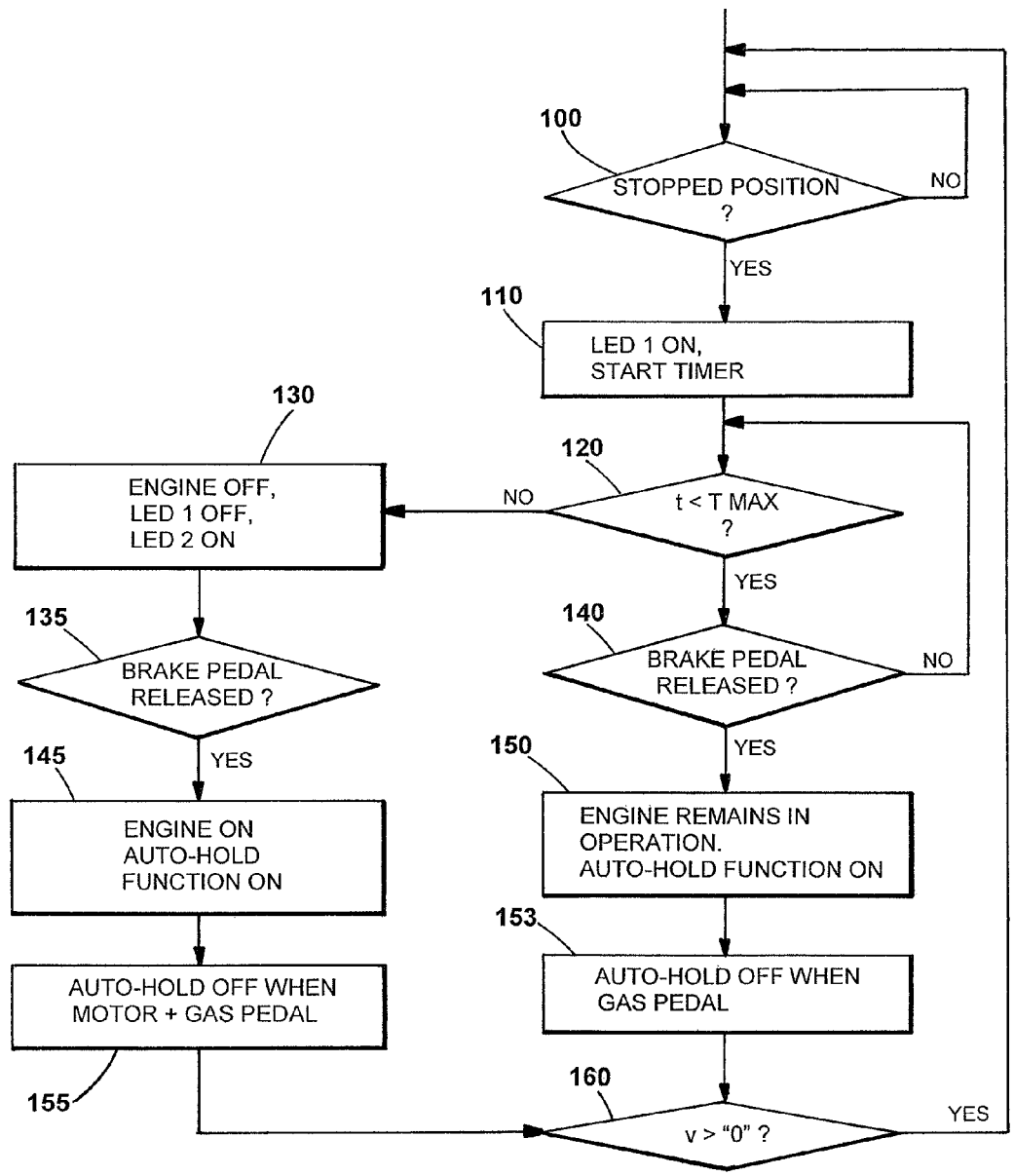

METHOD FOR AUTOMATICALLY TURNING OFF AN INTERNAL-COMBUSTION ENGINE

CROSS-REFERENCE TO RELATED APPLICATIONS

This application is a continuation of PCT International Application No. PCT/EP2009/006408, filed Sep. 4, 2009, which claims priority under 35 U.S.C. §119 from German Patent Application Nos. DE 10 2008 061 791.1, filed Dec. 11, 2008 and DE 10 2008 049 801.7, filed Sep. 30, 2008, the entire disclosures of which are herein expressly incorporated by reference.

BACKGROUND AND SUMMARY OF THE INVENTION

The invention relates to a method for automatically turning off an internal-combustion engine in a vehicle, particularly in a motor vehicle having an automatic transmission, by use of a start-stop device that automatically turns off the internal-combustion engine if the vehicle is braked to a stop and is held at a stop for a predefined time interval by operating the brake pedal.

Currently, internal-combustion engines are usually turned off by the driver by use of an ignition key. A method described in DE 100 23 331 A1 represents an exception. In this case, the brake pedal position or the brake pedal pressure is analyzed instead of the ignition key. The turning-off operation of the internal-combustion engine will be initiated when, after the motor vehicle has come to a stop, the brake pedal is increasingly applied in its already applied position. Processes of this type have the disadvantage that the motor vehicle driver alone is responsible for turning-off the internal-combustion engine. Analyses of today's vehicle handling reveal that, despite an increased ecological awareness and higher fuel prices, a manual turning-off of the internal-combustion engine, for example, at traffic lights, rarely takes place independently.

In order to reduce fuel consumption and pollutant emissions, methods and systems are currently being developed, and partly also already in use, which automatically turn off the internal-combustion engine of a motor vehicle under certain conditions and automatically turn it on again under predefined turn-on conditions. Such methods and systems, or start-stop devices, are suitable mainly for city traffic for reducing fuel consumption, because, in city traffic, the vehicle often comes to a stop at traffic lights or as a result of traffic, and the operation of the internal-combustion engine will not be necessary.

A system is known, for example, from EP 0 158 605 B1, which system causes a turning-off and/or a restarting of the internal-combustion engine as a function of different conditions. One condition for initiating an automatic turning-off operation is, for example, that the vehicle speed should be below a limit value for a certain time period before the internal-combustion engine is automatically turned off.

It is a disadvantage of such methods and systems that the current traffic situation cannot be taken into account. The internal-combustion engine is therefore also turned off in those situations in which, for reasons of comfort, this is not desired by the driver. For example, an automatic turning-off of the internal-combustion engine would not be desirable in a turning lane or at a stop sign when there is the possibility of immediately continuing the drive. Particularly in the case of vehicles with an automatic transmission, provided that, during a braking operation to a stopped position, the internal-combustion engine is automatically shut off, the driver cannot prevent an automatic turning-off operation. When a reasonably priced pinion starter is used as a starting system, starter engagement, and thus a starting of the running internal-combustion engine, will not be possible or be associated with a loss of comfort since, in principle, the pinion starter is only able to engage again when the internal-combustion engine has completely shut off. This may possibly also result in longer starting times.

To prevent this problem, methods and systems are known by which the driver can prevent an automatic turning-off. EP 1 469 195 B1 discloses a method for automatically turning off an internal-combustion engine in a vehicle where, within a predefined time interval after coming to a stop, the driver can prevent the automatic turn-off operation. For example, the automatic turn-off operation will not be initiated if the driver increasingly steps on the brake pedal (applies more pressure) within the predefined time interval after coming to a stop. According to the process disclosed in EP 1 052 399 A2, an automatic engine stoppage, which in principle will be initiated when the vehicle is braked to a stop, will be prevented when the reverse gear is engaged.

It is an object of the invention to improve a method for automatically turning off an internal-combustion engine in a vehicle with and without an automatic transmission such that, when braking the vehicle to a stop, the driver can easily and intuitively prevent the automatic turn-off operation.

According to the invention, this and other objects are achieved by a method for automatically turning off an internal-combustion engine in a motor vehicle either equipped with our without an automatic transmission (including an at least partially automated transmission), by use of a start-stop device. In principle, an automatic turn-off operation will be initiated when the vehicle is braked to a stop by the driver and the stoppage is maintained for a predefined time interval. A stoppage of the vehicle will be recognized when the vehicle speed is at least almost zero or exactly zero. When the vehicle is held in its stopped position within the predefined time interval by the application of the brake pedal, the internal-combustion engine will be automatically turned off by the start-stop device. The start-stop device may, for example, be an independent control device, or may be integrated in the engine control unit.

When the driver brings the motor vehicle to a stop, for example, at a stop sign and recognizes that it is possible to immediately continue the drive, the automatic turning-off of the internal-combustion engine will not be desired. Within the predefined time interval, the driver should therefore have the opportunity to prevent the automatic turning-off operation. Accordingly, an automatic turning-off of the internal-combustion engine can be prevented by the driver when the driver releases the brake pedal within the predefined time interval after coming to a stop. In other words, the driver reduces the braking pressure applied by the brake pedal by a corresponding operation of the brake pedal. In order to be able to recognize a releasing of the brake pedal, for example, a signal of a switch, such a brake light switch, arranged in the brake pedal can be analyzed. If the brake pressure generated by the brake pedal or the brake torque is to be analyzed, the brake pressure or the torque can be determined, for example, by use of a corresponding sensor.

This method is particularly advantageous for vehicles with automatic transmissions because here, as a rule, the driver leaves the gear selector lever in the normal position when the vehicle is stopped and no clutch pedal is present which could be evaluated with respect to the driver's intention. In addition to conventional automatic transmissions, the term "automatic transmission" also applies to at least partly automated transmissions, including double clutch transmissions (transmissions with and without converters, EGS, SMG). However, this method can also be used for vehicles having manual transmissions.

The method according to the invention can further be developed such that, with the beginning of the time interval within which the automatic turning-off operation can be prevented, a holding function can be activated (in the background) for the independent holding of the vehicle when the vehicle is stopped without operating the brake. As a result, it can be ensured that the vehicle is also held in the stopped position when the driver releases the brake pedal for preventing an automatic turning-off operation.

If the holding function is not automatically activated when coming to a stop, the holding function (for preventing a rolling-away of the vehicle when the brake is released) should be automatically activated not later than when the driver releases the brake pedal for preventing the automatic turning-off operation within the time interval. If the driver does not prevent the turning-off operation, and the holding function is not yet active, in the case of a turned-off internal-combustion engine, the holding function should be activated not later than when the driver releases the brake pedal (for example, for initiating the automatic starting operation).

The term "holding function" applies to all functions or interventions which prevent at least a forward or rearward movement of the vehicle. When the driver reduces the brake pressure for releasing the brake pedal and, within the predefined time interval, prevents the automatic turning-off operation of the internal-combustion engine, the creeping function of the vehicle generated by way of a hydraulic converter can be deactivated, for example, for maintaining the stoppage of the vehicle, corresponding to an activating of the holding function. In addition or as an alternative, the vehicle can simultaneously be held in the stopped position by means of a braking intervention, which can be automatically activated in the stopped position; i.e., parking brake functions, for example, are activated for the temporary holding of an operationally ready motor vehicle in the stopped position. Such braking interventions or functions and the corresponding devices are known, for example, by the names "starting assistant", "hill assistant", "hill hold(er)", "Automatic Hold" or within the scope of cruise control systems with a ranging function to the stopped position. These systems, which prevent an operationally ready motor vehicle from starting to roll, are constructed, for example, as (electro)hydraulic, (electro)pneumatic, or possibly also as electromechanical, electronically controllable braking systems, by which the operationally ready motor vehicle is temporarily held and prevented from starting to roll.

Methods are also known by which the vehicle is prevented from starting to roll by way of the transmission (particularly an automatic transmission) or by means of a corresponding transmission function. Accordingly, as an alternative or in addition to the active braking intervention or for deactivating an existing creeping function, a so-called auto-P function can be activated as a holding function for holding the vehicle in the stopped position.

In an advantageous embodiment of the method according to the invention, this automatically activated holding function for holding the vehicle in the stopped position will be deactivated when the internal-combustion engine, which was automatically switched off after the predefined time interval after the vehicle had come to a stop, is automatically switched on, and/or when the gas pedal is operated and/or when the internal-combustion engine provides a sufficiently large drive torque for accelerating the vehicle from the stopped position.

If the driver does not release the brake pedal within the predefined time interval after the vehicle has come to a stop, the internal-combustion engine will be automatically turned off after the expiration of the time interval. Simultaneously, the turning-off of the internal-combustion engine can also activate a holding function. If the holding function had already been activated, it may remain active.

Advantageously, the automatically turned-off internal-combustion engine will automatically be turned on again: (1) when the driver releases the brake pedal, (2) when the brake pressure applied by the driver falls below a predefined brake pressure threshold value, (3) when the brake torque applied by the driver falls below a predefined brake torque threshold value, and/or (4) when the negative braking gradient (brake torque gradient or brake pressure gradient) reached when the brake pedal is released, reaches or exceeds a predefined braking gradient threshold value or when the driver operates the gas pedal.

In order to prevent the vehicle from rolling away even before the start of the internal-combustion engine—as illustrated above—while the internal-combustion engine is turned off, a holding function or a parking brake function, particularly an auto hold function can be activated not later than simultaneously with the release of the brake pedal or with the reduction of the brake pressure applied by the driver. This auto-hold function remains active until the drive unit is started, and the vehicle starts to move or could start to move either as a result of the gas pedal operation or of the creeping function.

Advantageously, the motor vehicle driver can be informed by way of a first indicating element as soon as he can prevent the automatic turning-off of the internal-combustion engine. When the predefined operating conditions have been met, i.e. the vehicle was braked to a stop and all other conditions were also met, for example, an LED will light up signaling to the driver that the internal-combustion engine will shortly be turned off by the start-stop device. However, loudspeakers for an acoustic signal or other elements for visual or haptic signals may also be used as indicating elements. Starting at this point-in-time, the motor vehicle driver can prevent the turning-off of the internal-combustion engine. As an alternative or in addition, a second indicating element can be activated if the internal-combustion engine was automatically turned off. The second indicating element may be further developed such that it informs the driver as to how or by which action he can again initiate a start of the internal-combustion engine. If this can take place, for example, by releasing the brake pedal, a brake pedal symbol will be displayed from which the foot is moving away.

As an alternative or in addition, a third indicating element can be activated for the duration of the active holding function, so that the driver knows that the vehicle is maintained in the stopped position despite the releasing of the brake pedal.

Other objects, advantages and novel features of the present invention will become apparent from the following detailed description of one or more preferred embodiments when considered in conjunction with the accompanying drawings.

BRIEF DESCRIPTION OF THE DRAWING

The single FIGURE is a simplified flow chart illustrating an embodiment of the method according to the invention with respect to a motor vehicle having an automatic transmission.

DETAILED DESCRIPTION OF THE DRAWING

The method begins in Step 100 where all conditions (driver-side conditions, such as brake operation, and system-side conditions, such as the battery condition), which are necessary for an automatic turning-off of the internal-combustion engine are retrieved. In particular, it is queried whether the vehicle was braked to a stop as a result of the driver's brake operation.

As soon as a braking of the vehicle to a stop has occurred and all other (system-side) turn-off conditions have been met, an LED1 is switched on as a first indicating element in the next Step 110. The motor vehicle driver is thereby informed that the internal-combustion engine will turn off after the expiration of a predefined time interval Tmax unless prevented by the driver. Simultaneously, a timer is started in Step 110 for monitoring the predefined time interval Tmax (for example, 1 second) within which the driver can prevent the automatic turn-off operation.

Subsequently, in a next Step 120, the time t is retrieved that has passed since the start of the timer. As long as the time t that has passed is shorter than the predefined time interval Tmax, in a next Step 140, a release of the brake pedal will be monitored. When no release of the brake pedal was detected, a return to Step 120 takes place and the monitoring of the time is continued. As soon as the timer has run out, i.e., the time t that has passed since the starting of the timer is greater than the predefined time interval Tmax, then the internal-combustion engine is automatically turned off in a known manner in Step 130. Simultaneously, the first LED1 is deactivated and a second display LED2 is activated. The second display LED2 informs the driver that the vehicle can be restarted by releasing the brake pedal.

Furthermore, when the engine is turned off, in the next Step 135, a releasing of the brake pedal is monitored. As soon as a releasing of the brake pedal is detected when the internal-combustion engine is automatically turned off, the automatic starting operation is initiated in Step 145 and the engine is started, for example, by means of a pinion starter. If required, in order to prevent a rolling-away of the vehicle between the point-in-time of the release of the brake pedal and the point-in-time as of which the engine generates a drive torque, a so-called auto-hold function can be activated as an automatic holding function for holding the vehicle in the stopped position. As an alternative, but not shown here, the holding function can also already be activated with the turning-off of the internal-combustion engine in Step 130 or with the vehicle's coming to a stop in Step 110. A corresponding indication in the instrument cluster can be activated simultaneously. In principle, the driver would not notice that the holding function (auto-hold) is already active, but a corresponding indication would inform him that, when the brake pedal is released for the restarting of the internal-combustion engine, the vehicle will roll away (despite a sloping of the road) but will be held in the stopped position.

After the turning-on of the engine, Step 155 will be carried out. The automatically activated holding function will be deactivated again there, as soon as the driver has his foot on the gas pedal, and the internal-combustion engine can supply sufficient drive torque M for accelerating the vehicle. The method will start again only if, in a last Step 160, as a result of the gas pedal operation, the vehicle speed is again greater than approximately zero.

However, if a release of the brake pedal is detected (Step 140) within the predefined time interval Tmax, it is assumed that the driver does not wish to automatically have the engine turned off. Accordingly, the automatic turning-off of the internal-combustion engine will be prevented in Step 150. The internal-combustion engine will remain operative. In order to prevent a rolling-away of the vehicle when the brake is released, the auto-hold function will be automatically activated as the holding function, particularly as an automatic braking intervention for holding the vehicle in the stopped position, and Step 153 will be carried out. As soon as it can be recognized that the driver is again applying the gas pedal, the automatically activated holding function will be deactivated again. It is only if, in a last Step 160, the vehicle speed is again greater than approximately zero because of the operation of the gas pedal that the method will start again.

Since, by means of this method, the driver can actively prevent an automatic turning-off of the internal-combustion engine, a reasonably priced pinion starter can be used as the starting system because, as a rule, restarting during the coasting phase of the internal-combustion engine will not be necessary. In order to ensure a start also during the coasting phase of the internal-combustion engine, a starter generator in the belt drive can be used as the starting system, which starter generator can implement a device to start the engine at any time. However, such starter systems result in higher costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically turning off an internal-combustion engine in a motor vehicle using a start-stop device, the method comprising the acts of:
   automatically turning off the internal-combustion engine if the motor vehicle is braked to a stop by operation of a brake pedal and is held at the stop for a predefined time interval;
   within the predefined time interval after the vehicle reaches the stop, preventing the automatic turning-off of the internal-combustion engine upon a release of the brake pedal within the predefined time interval; and
   holding the vehicle at the stop via a holding function automatically activatable in a stopped position, the holding act being carried out in response to the release of the brake pedal within the predefined time interval or a release of the brake pedal after the predefined time interval elapsed,
   in the event that the internal-combustion engine was automatically turned off after the predefined time interval elapsed, deactivating the holding function when the internal-combustion engine is automatically turned on.

2. The method according to claim 1, wherein the holding act via the holding function is carried out by at least one of deactivating a creep function, activating a brake intervention function, and activating a transmission holding function.

3. The method according to claim 2,
   wherein deactivating the holding function when the internal-combustion engine is automatically turned on comprises deactivating the holding function when the internal-combustion engine is automatically turned on and supplies a sufficient drive torque for accelerating the vehicle from the stopped position.

4. The method according to claim 2, further comprising the act of:
   automatically turning on the internal-combustion engine that was automatically turned off after the predefined time interval elapsed when one of the following acts occurs:
   (a) the release of the brake pedal after the predefined time interval elapsed;

(b) brake pressure falling below a predefined brake pressure threshold value;
(c) brake torque falling below a predefined brake torque threshold value;
(d) a negative braking gradient, which occurs when the brake pedal is released, reaching or exceeding a predefined braking gradient threshold value; and
(e) operation of a gas pedal.

5. The method according to claim 1,
wherein deactivating the holding function when the internal-combustion engine is automatically turned on comprises deactivating the holding function when the internal-combustion engine is automatically turned on and
supplies a sufficient drive torque for accelerating the vehicle from the stopped position.

6. The method according to claim 5, further comprising the act of:
automatically turning on the internal-combustion engine that was automatically turned off after the predefined time interval elapsed when one of the following acts occurs:
(a) the release of the brake pedal after the predefined time interval elapsed;
(b) brake pressure falling below a predefined brake pressure threshold value;
(c) brake torque falling below a predefined brake torque threshold value;
(d) a negative braking gradient, which occurs when the brake pedal is released, reaching or exceeding a predefined braking gradient threshold value; and
(e) operation of a gas pedal.

7. The method according to claim 1, further comprising the act of:
automatically turning on the internal-combustion engine that was automatically turned off after the predefined time interval elapsed when one of the following acts occurs:
(a) the release of the brake pedal after the predenfined time interval elapsed;
(b) brake pressure falling below a predefined brake pressure threshold value;
(c) brake torque falling below a predefined brake torque threshold value;
(d) a negative braking gradient, which occurs when the brake pedal is released, reached or exceeding a predefined braking gradient threshold value; and
(e) operation of a gas pedal.

8. A method according to claim 1, further comprising the act of:
activating a first indicating element when the stopped position of the vehicle is reached.

9. The method according to claim 8, further comprising the act of:
activating a second indicating element when the internal-combustion engine is turned off.

10. The method according to claims 9, further comprising the act of:
activating a third indicating element when the holding function of the motor vehicle is activated.

11. The method according to claim 1, further comprising at least one of the following acts:
activating a first indicating element when the stopped position of the vehicle is reached;
activating a second indicating element when the internal-combustion engine is turned off; and
activating a third indicating element when the holding function of the motor vehicle is activated.

12. A motor vehicle system, comprising:
an internal-combustion engine of the motor vehicle;
a start-stop device for automatically turning-off the internal-combustion engine if the motor vehicle is braked to a stop by operation of a brake pedal and is held at the stop for a predefined time interval; and
wherein the start-stop device is operatively configured to prevent the turning-off of the internal-combustion engine within the predefined time interval after the motor vehicle is stopped upon receipt of a signal within the predefined time interval indicative of a release of a brake pedal of the motor vehicle, and
wherein the start-stop device is further operatively configured to hold the vehicle at the stop via a holding function automatically activatable in a stopped position, the hold being carried out in response to the release of the brake pedal within the predefined time interval or a release of the brake pedal after the predefined time interval elapsed,
in the event that the internal-combustion engine was automatically turned off after the predefined time interval elapsed, the holding function is deactivated when the internal-combustion engine is automatically turned on.

13. The system according to claim 12, wherein the hold function comprises at least one of a creep function deactivation, a brake intervention function, and a transmission holding function.

14. The system according to claim 12, wherein the start-stop device is further operatively configured to deactivate the holding function when the internal-combustion engine is automatically turned on and
supplies a sufficient drive torque for accelerating the vehicle from the stopped position.

15. The system according to claim 12, wherein the start-stop device is further operatively configured to:
automatically turn on the internal-combustion engine that was automatically turned off after the predefined time interval elapsed upon one of the following:
(a) the release of the brake pedal after the predefined time interval elapsed;
(b) brake pressure falling below a predefined brake pressure threshold value;
(c) brake torque falling below a predefined brake torque threshold value;
(d) a negative braking gradient, which occurs when the brake pedal is released, reaching or exceeding a predefined braking gradient threshold value; and
(e) operation of a gas pedal.

16. The system according to claim 12, further comprising:
a first indicating element that is activated when the stopped position of the vehicle is reached.

* * * * *